US012526068B2

(12) United States Patent
Kaplan et al.

(10) Patent No.: US 12,526,068 B2
(45) Date of Patent: Jan. 13, 2026

(54) ANTI-JAMMING USING DUAL CHANNEL MULTI-FREQUENCY NULL-STEERING APPROACH

(71) Applicant: Infinidome Ltd., Caesarea (IL)

(72) Inventors: Moshe Kaplan, Pardes Hana-Karkur (IL); Alexander Avraham Katz, Binyamina, IL (US)

(73) Assignee: Infinidome Ltd., Caesarea (IL)

( * ) Notice: Subject to any disclaimer, the term of this patent is extended or adjusted under 35 U.S.C. 154(b) by 422 days.

(21) Appl. No.: 18/200,652

(22) Filed: May 23, 2023

(65) Prior Publication Data
US 2024/0396662 A1  Nov. 28, 2024

(51) Int. Cl.
*H04B 7/0417* (2017.01)
*H04K 3/00* (2006.01)

(52) U.S. Cl.
CPC .............. *H04K 3/228* (2013.01); *H04K 3/25* (2013.01)

(58) Field of Classification Search
CPC ............ H04K 3/228; H04K 3/25; H01Q 3/26; H01Q 3/2611; H04B 7/043; H04B 7/0417; H04B 17/12; H04B 17/221; H04B 1/0475; H04B 1/7097; H04B 1/715; H04B 1/719; H04B 15/02; H04B 1/10
See application file for complete search history.

(56) References Cited

U.S. PATENT DOCUMENTS

| 5,712,641 | A | 1/1998 | Casabona et al. |
| 6,590,528 | B1 | 7/2003 | DeWulf |
| 6,861,983 | B2 | 3/2005 | Casabona et al. |
| 7,015,858 | B2 | 3/2006 | Fuchser et al. |
| 8,543,053 | B1 * | 9/2013 | Melamed ................. H04K 3/46 455/226.1 |
| 8,965,319 | B2 | 2/2015 | Wilkerson et al. |
| 9,026,070 | B2 | 5/2015 | Persico et al. |
| 9,612,342 | B2 | 4/2017 | Petersen |
| 10,461,789 | B2 * | 10/2019 | Dimpflmaier .......... H04K 3/226 |
| 10,739,466 | B2 | 8/2020 | Grobert |
| 11,194,053 | B1 | 12/2021 | Johnston et al. |
| 11,255,977 | B2 | 2/2022 | Stockmaster |

(Continued)

OTHER PUBLICATIONS

International Search Report and the Written Opinion Dated Aug. 23, 2024 From the International Searching Authority Re. Application No. PCT/IL2024/050496. (11 Pages).

*Primary Examiner* — Andrew Wendell

(57) ABSTRACT

An anti-jamming circuit for null-steering jamming Radio-Frequency (RF) signals, comprising (1) an input circuit for receiving RF signals from multiple distinct antenna elements, and producing a plurality of signal groups each comprising a respective pair of filtered signals received from a respective pair of antenna elements each mapping them in one of the plurality of frequency bands, (2) a feedback circuit for adjusting the amplitude and/or the phase of the filtered signals of each signal group according to comparison between its pair of filtered signals until a difference between their amplitudes is minimized and their phases are opposite, aggregating the pair of adjusted signals of each signal group to produce a aggregated group signals, and aggregating the plurality of aggregated group signals to produce an overall aggregated signal, and (3) an output circuit for outputting the aggregated signal to a receiver adapted to extract data from the aggregated signal.

20 Claims, 3 Drawing Sheets

(56) References Cited

U.S. PATENT DOCUMENTS

Figure 1:
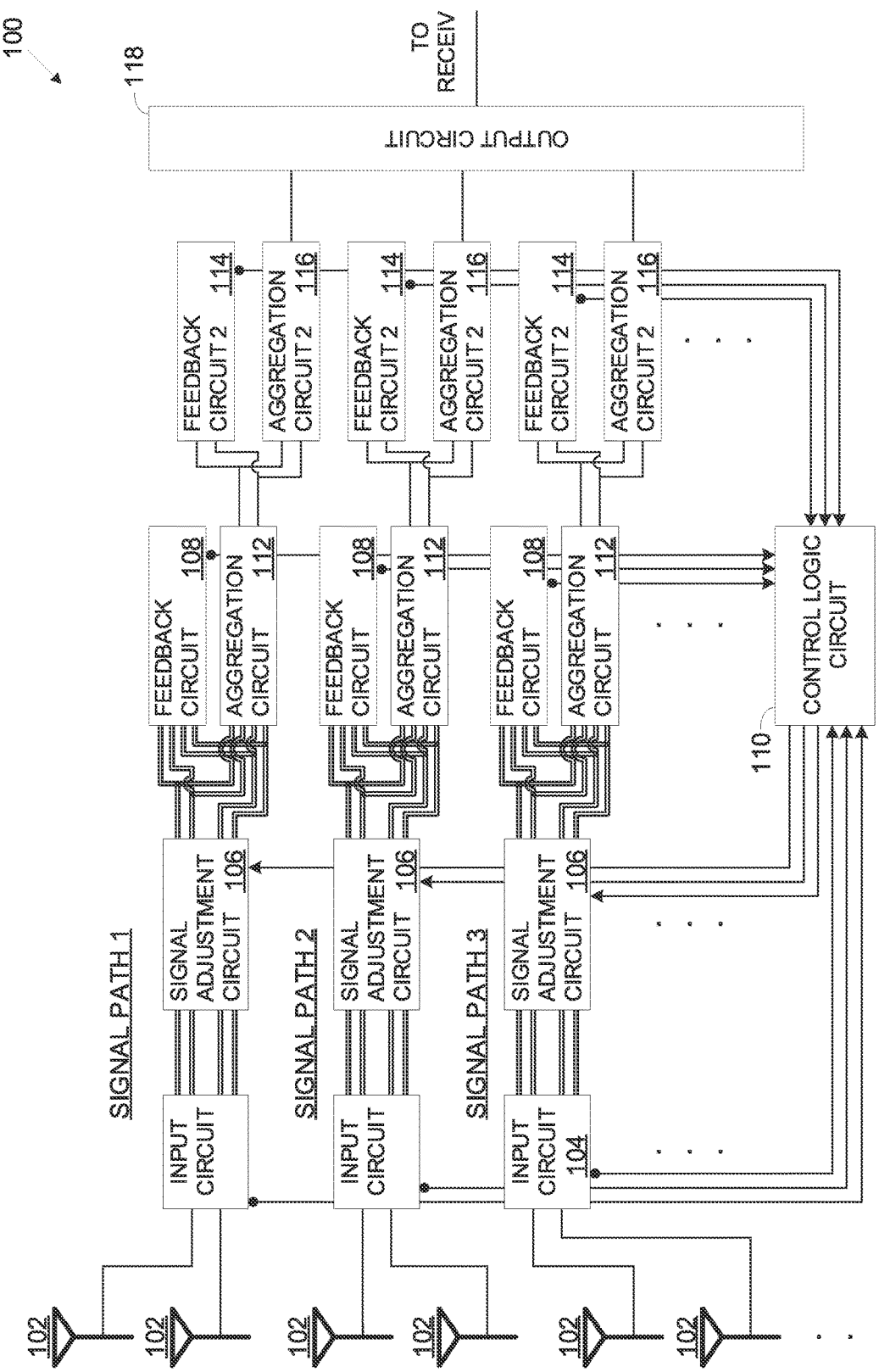

| | | | |
|---|---|---|---|
| 11,262,458 B2 | 3/2022 | Akos et al. | |
| 11,391,846 B2 | 7/2022 | Jones et al. | |
| 12,355,557 B2* | 7/2025 | Kumar | H04K 3/25 |
| 2004/0164900 A1 | 8/2004 | Casabona et al. | |
| 2007/0268174 A1* | 11/2007 | Ham | G01S 19/21 |
| | | | 342/357.29 |
| 2013/0315341 A1* | 11/2013 | Couillard | H04K 3/28 |
| | | | 375/285 |
| 2016/0260304 A1* | 9/2016 | Yang | G06K 7/10336 |
| 2017/0346182 A1* | 11/2017 | Martikkala | H01Q 3/267 |
| 2019/0236962 A1* | 8/2019 | Tholen | G08G 5/57 |
| 2020/0052756 A1* | 2/2020 | Raghavan | H04B 7/088 |
| 2021/0048535 A1 | 2/2021 | Kaplan | |
| 2021/0075100 A1* | 3/2021 | Kwon | H04B 7/0845 |
| 2022/0038202 A1* | 2/2022 | Welsh | H03H 11/34 |
| 2022/0200838 A1* | 6/2022 | Azadet | H03D 3/009 |
| 2022/0330040 A1 | 10/2022 | Kaplan | |

* cited by examiner

ANTI-JAMMING USING DUAL CHANNEL MULTI-FREQUENCY NULL-STEERING APPROACH

FIELD AND BACKGROUND OF THE INVENTION

The present invention, in some embodiments thereof, relates to recovering jammed Radio Frequency (RF) signals and, more particularly, but not exclusively, to recovering jammed RF signals using dual-channel multi-frequency null-steering.

RF jamming is the deliberate broadcasting of jamming RF signals on the same frequency as intended genuine, legitimate and valid RF signals of an authorized transmitter, in order to degrade intended RF signals and disrupt the normal functioning of the receiver.

RF jamming may wear many forms and techniques, for example, noise jamming which is the simplest form of jamming, where one or more transmitters may generate wideband noise signal broadcasted on the same frequency as intended RF signal which may significantly reduce its signal-to-noise ratio making it impossible to receive the intended signal.

In another example, RF jamming may comprise sweep jamming in which one or more transmitters may generate an RF signal that sweeps across a range of frequencies and/or frequency bands which may cause the receiver to be overwhelmed by the jamming signal, making it impossible to lock onto the intended signal.

In another example, RF jamming may comprise spot jamming in which one or more transmitters may generate high-power signals on the exact frequency of the intended signal which may overload the receiver making it impossible to receive the intended signal.

In another example, RF jamming may comprise reactive jamming in which a jammer may use a receiver to detect the intended signal, and then operate one or more transmitters to transmit jamming signals specifically designed to interfere with the intended signal.

SUMMARY OF THE INVENTION

An objective of the embodiments of the disclosure is to provide a solution for positioning formworks for casting concrete walls of a structure which mitigates or solves the drawbacks and problems of conventional solutions. The above and further objectives are solved by the subject matter of the independent claims. Further advantageous embodiments can be found in the dependent claims.

According to a first aspect of the present invention there is provided an anti-jamming circuit for null-steering jamming RF signals, comprising:

One or more input circuits adapted to receive a plurality of RF signals from a plurality of antenna elements, and produce a plurality of signal groups each corresponding to a respective one of a plurality of frequency bands. Each signal group comprises a respective pair of filtered signals received from a respective pair of the plurality of antenna elements each mapping a respective one of the plurality of RF signals in the respective frequency band.

A feedback circuit adapted to adjust the amplitude and/or the phase of one or more filtered signals of each signal group according to comparison between the pair of filtered signals of the respective group until a difference between the amplitudes of the adjusted signals of each signal group is minimized and their phases are opposite, aggregate the pair of adjusted signals of each signal group to produce a plurality of aggregated group signals, and aggregate the plurality of aggregated group signals to produce an overall aggregated signal.

An output circuit adapted to output the aggregated signal to one or more receivers adapted to extract data from the aggregated signal.

According to a second aspect of the present invention there is provided a method of null-steering jamming radio-frequency (RF) signals, comprising:

Receiving a plurality of RF signals from a plurality of antenna elements;

Producing a plurality of signal groups each corresponding to a respective one of a plurality of frequency bands. Each signal group comprises a respective pair of filtered signals received from a respective pair of the plurality of antenna elements each mapping a respective one of the plurality of RF signals in the respective frequency band.

Adjusting the amplitude and/or the phase of one or more filtered signals of each signal group according to comparison between the pair of filtered signals of the respective group until a difference between the amplitudes of the adjusted signals of each signal group is minimized and their phases are opposite.

Aggregating the pair of adjusted signals of each signal group to produce a plurality of aggregated group signals.

Aggregating the plurality of aggregated group signals to produce an aggregated signal;

Outputting the aggregated signal to one or more receivers adapted to extract data from the aggregated signal.

In a further implementation form of the first, and/or second aspects, the one or more input circuits comprise a splitter adapted to split a primary RF signal received from a primary antenna element of the two antenna elements into a primary first signal and a primary second signal, and one or more another splitters adapted to split a secondary RF signal received from a secondary antenna element into a secondary first signal and a secondary second signal. Wherein the primary first signal and the secondary first signal are grouped together to form a first group of the plurality of signal groups, and the primary second signal and the secondary second signal are grouped together to form one or more second groups of the plurality of signal groups.

In a further implementation form of the first, and/or second aspects, the one or more input circuits comprise one or more sets of band-pass filters. Each of the one or more sets of band-pass filters comprises a first pair of band-pass filters adapted to produce a filtered primary first signal mapping the primary first signal in a respective one of the plurality frequency bands, and a filtered secondary first signal mapping the secondary first signal in a respective one of the plurality frequency bands, and a second pair of band-pass filters adapted to produce a filtered primary second signal mapping the primary second signal in another one of the plurality frequency bands, and a filtered secondary second signal mapping the secondary second signal in the another one of the plurality frequency bands.

In an optional implementation form of the first, and/or second aspects, the first band-pass filters and/or the second band-pass filters are adjusted to select the respective frequency band and/or the another one frequency band.

In an optional implementation form of the first, one or more of the filtered signals are monitored to detect jamming signals.

In a further implementation form of the first, and/or second aspects, the feedback circuit comprises one or more sets of vector modulators. Each of the one or more sets of vector modulators comprises a first vector modulator adapted to adjust an amplitude and/or a phase of each filtered first signal, and a second vector modulator adapted to adjust an amplitude and/or a phase of each filtered second signal.

In a further implementation form of the first, and/or second aspects, the one or more input circuits comprise one or more sets of variable gain amplifiers (VGA) adapted to adjust one or more of the filtered first signals and/or one or more of the filtered second signals to balance them before injected to the first vector modulator and/or the second vector modulator respectively.

In a further implementation form of the first, and/or second aspects, the feedback circuit comprises one or more sets of comparators. Each of the one or more sets of comparators comprises a first comparator adapted to compare the amplitude and phase of the adjusted first signals, and a second comparator adapted to compare the amplitude and phase of the adjusted second signals.

In a further implementation form of the first, and/or second aspects, the feedback circuit comprises one or more sets of first-level signal combiners. Each of the one or more set of signal combiners comprises a first signal combiner adapted to aggregate the adjusted first signals, and a second signal combiner adapted to aggregate the adjusted second signals.

In a further implementation form of the first, and/or second aspects, the feedback circuit comprises one or more second-level signal combiners adapted to aggregate the aggregated first signals and the aggregated second signals.

In an optional implementation form of the first, and/or second aspects, the anti-jamming circuit comprises a logic circuit configured to sample the output of the first signal combiner and the output of the second signal combiner, and control the first vector modulator to adjust the amplitude and/or the phase of one or more of the filtered first signals according to the sampled output, and/or control the second vector modulator to adjust the amplitude and/or the phase of one or more of the filtered second signals according to the sampled output.

In a further implementation form of the first, and/or second aspects, each antenna element of each pair of antenna elements has a different spatial positioning.

In a further implementation form of the first, and/or second aspects, the plurality of signal groups are formed by splitting a primary RF signal received from a primary antenna element of the two antenna elements into a primary first signal and a primary second signal, splitting a secondary RF signal received from a secondary antenna element into a secondary first signal and a secondary second signal, grouping the primary first signal and the secondary first signal to form a first group of the plurality of signal groups, and grouping the primary second signal and the secondary second signal to form one or more second groups of the plurality of signal groups.

In a further implementation form of the first, and/or second aspects, a filtered primary first signal is produced to map the primary first signal in a respective one of the plurality frequency bands, and a filtered secondary first signal is produced to map the secondary first signal in a respective one of the plurality frequency bands. And a filtered primary second signal is produced to map the primary second signal in another one of the plurality frequency bands, and a filtered secondary second signal is produced to map the secondary second signal in the another one of the plurality frequency bands.

In a further implementation form of the first, and/or second aspects, a respective adjusted first signal is produced by adjusting an amplitude and/or a phase of each filtered first signal, and a respective adjusted second signal is produced by adjusting an amplitude and/or a phase of each filtered second signal.

In a further implementation form of the first, and/or second aspects, the comparison of the pair of filtered signals of a first signals group comprises comparing the amplitude and phase of the adjusted first signals, and comparison of the pair of filtered signals of a second signals group comprises comparing the amplitude and phase of the adjusted second signals.

In a further implementation form of the first, and/or second aspects, the adjusted first signals are aggregated to produce an aggregated first signal and the adjusted second signals are aggregated to produce an aggregated second signal.

In an optional implementation form of the first, and/or second aspects, the aggregated first signal and the aggregated second signal are sampled, and the amplitude and/or the phase of one or more of the filtered first signals is adjusted according to the sampled output, and/or the amplitude and/or the phase of one or more of the filtered second signals is adjusted according to the sampled output.

In a further implementation form of the first, and/or second aspects, the aggregated first signal and the aggregated second signal are aggregated to generate an overall aggregated signal.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL
VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

Figure 2:
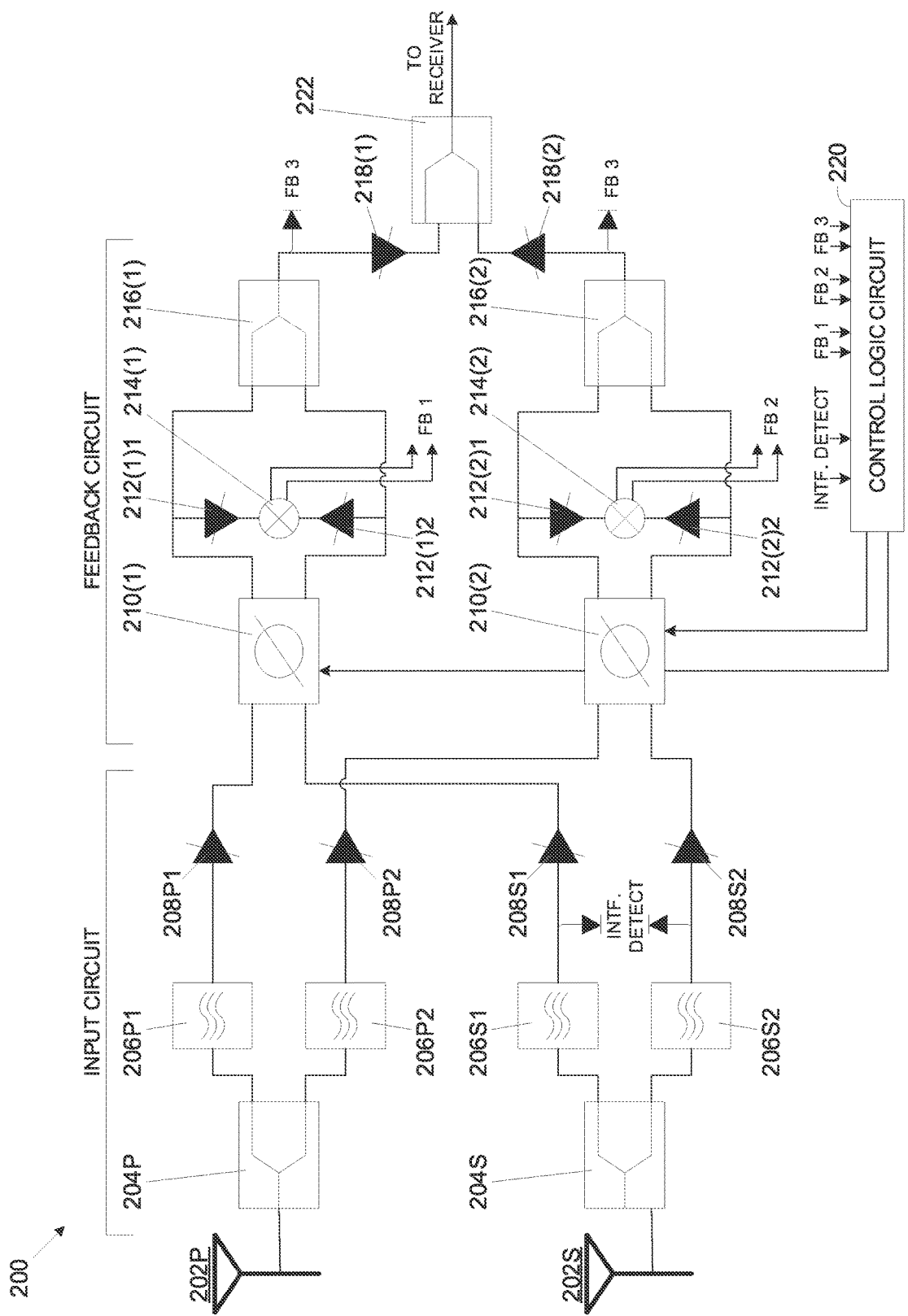
Figure 3:
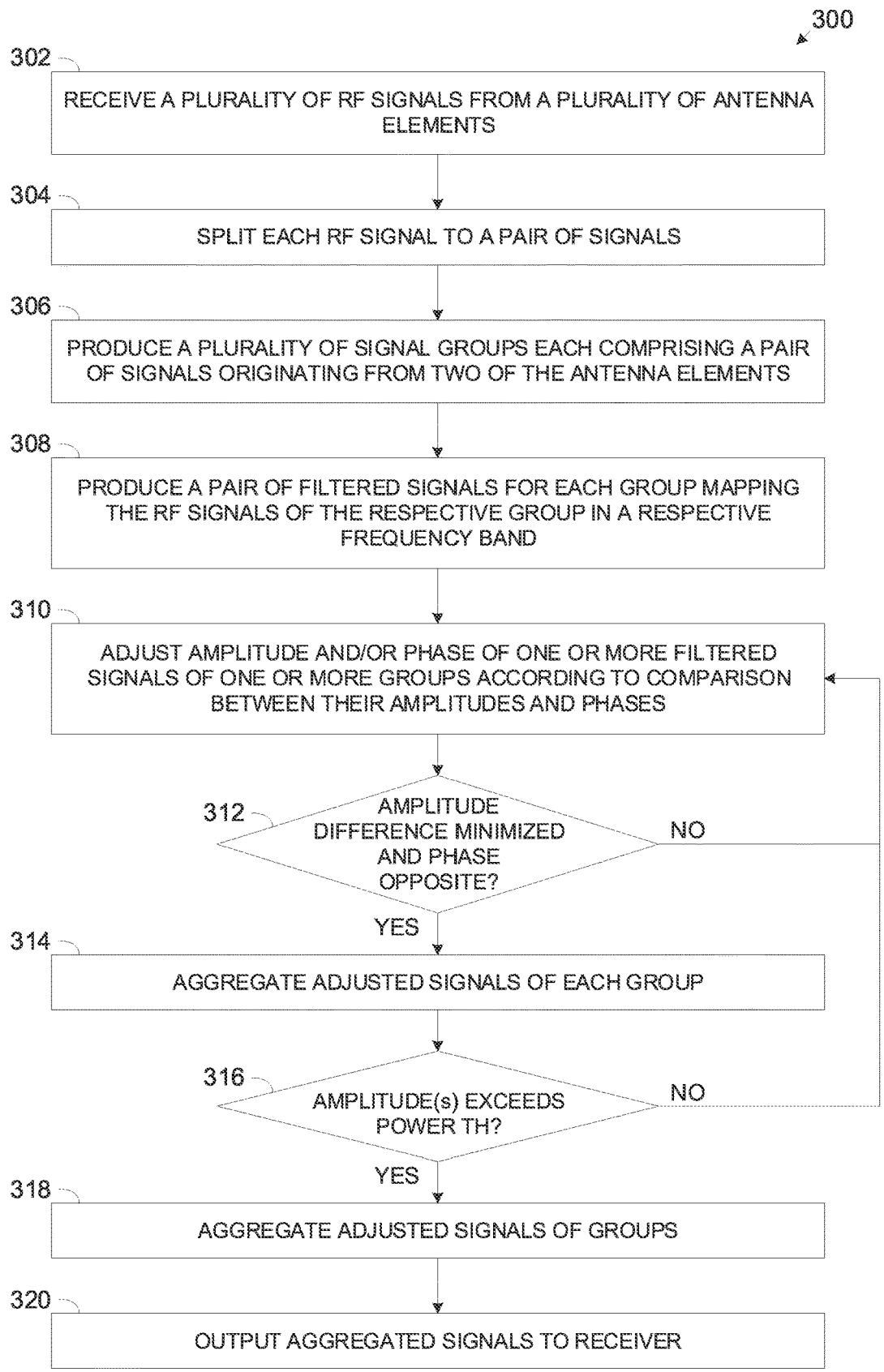

In the drawings:

FIG. 1 is a schematic illustration of an exemplary anti-jamming circuit employing dual channel multi-frequency null-steering for recovering jammed RF signals, according to some embodiments of the present invention;

FIG. 2 is a schematic illustration of an exemplary single path anti-jamming circuit employing dual channel multi-frequency null-steering for recovering jammed RF signals, according to some embodiments of the present invention; and FIG. 3 is a flowchart of an exemplary process of recovering jammed RF signals using and anti-jamming circuit employing dual channel multi-frequency null-steering, according to some embodiments of the present invention.

DETAILED DESCRIPTION OF EMBODIMENTS
OF THE INVENTION

The present invention, in some embodiments thereof, relates to recovering jammed RF signals and, more particularly, but not exclusively, to recovering jammed RF signals using dual-channel multi-frequency null-steering.

According to some embodiments of the present invention there are provided devices, circuits, and methods for applying null-steering to recover received RF signals which may be potentially subject to jamming which may degrade the RF signals and may therefore potentially prevent efficient recovery of data encoded in the RF signals.

Jamming as used herein refers to jamming signals intentionally transmitted in malicious attempt to degrade the RF signals as well as background emission which may be present with no malicious intent but may also degrade and/or affect the RF signals.

The anti-jamming circuit and/or device, collectively designated anti-jamming circuit, may be deployed and/or used as a pre-processing circuit for recovering potentially jammed RF signals, for example, Global Navigation Satellite System (GNSS) signals, communication signals, control signals and/or the like before driven into a respective RF receiver adapted to receive and decode such signals.

The anti-jamming circuit may employ one or more structures, architectures, and/or designs, for example, an independent stand-alone device, and/or integrated in one or more RF receivers in the form of one or more Integrated Circuits (IC), one or more component and/or circuits, and/or a combination thereof.

The anti-jamming circuit may receive RF signals captured (intercepted) by a plurality of antenna elements, for example, an antenna array, multiple indecent antennas, and/or the like each having a different spatial positioning, for example, location, orientation, position, and/or the like. As such, each pair of antenna elements may enable recovery of the RF signals from directional jamming signals transmitted towards the antenna elements from a single direction and each additional pair of antenna elements having different spatial positioning may therefore enable recovery of the RF signals from directional jamming signal's transmitted from another (additional) direction.

The anti-jamming circuit may split the RF signals received from each antenna element into two identical signals and produce (form) a plurality of signal groups each comprising a pair of signals, each from a respective one of two antenna elements. The signals of each signal group may be mapped to a respective one of a plurality of frequency bands, i.e., passed through respective band-pass filters adapted to pass signal elements only in a defined (set, selected) frequency band.

In particular, each signal group may correspond to a respective one of a plurality of frequency bands and thus comprise a pair of filtered signals originating from two distinct antenna elements and mapped to the respective frequency band.

One or more of the frequency bands may be selected, set, defined, and/or adjusted according to one or more parameters, attributes, and/or characteristics of the received RF signals, the RF receiver, and/or the application utilizing the RF signals.

The pair of filtered signals of each signal group may be routed to a vector modulator adapted to adjust an amplitude and/or phase of one or more of the filtered signals. Optionally, the of filtered signals may be routed to the vector modulators via one or more Variable Gain Amplifiers (VGA) adapted to adjust, manipulate, balance, and/or condition one or more of the filtered signals.

The anti-jamming circuit may comprise a feedback loop employing a control logic circuit adapted to compare the adjusted signals of each signal group, analyze the comparison output and compute, derive, and/or determine accordingly a difference between their amplitudes and phases.

Based on the comparison, the filtered signals of each signal group may be adjusted until the difference between their amplitudes is minimized and their phases are substantially opposite, i.e., the difference between the phases aims towards 180° thus applying null-steering in the anti-jamming circuit and removing components of the jamming signals from the original RF signals.

The adjusted signals of each signal group may be then aggregated to produce a respective aggregated signal.

Each aggregated signal may be further sampled via a second-level feedback loop and analyzed to determine whether its amplitude complies with one or more criteria, constraints, and/or conditions, for example, falls below a certain power threshold, exceeds a certain power threshold, and/or the like, in case of non-compliance, the filtered signals of the corresponding signal group may be further adjusted, for example, via the vector modulator, until achieving compliance of the respective aggregated signal with the criteria, constraint(s), and/or condition(s).

The aggregated signals of the plurality of signal groups may be then aggregated to produce an overall aggregated signal (sum signal). In particular, the anti-jamming circuit may implement dual-channel aggregation in which the aggregated signals of every two signal groups may be aggregated together to produce a respective overall aggregated signal.

The overall aggregated signal may be routed to an output circuit adapted to produce an output signal which may be driven, output, and/or routed to the RF receiver.

Optionally, the output circuit may be adapted to further process and/or manipulate the multiple aggregated signals to produce the output signal. This may be applicable for anti-jamming circuits having directional antenna elements thus enabling recovery of the RF signals from the effect of jamming signals transmitted by a plurality of jamming transmitters (jammers) where the jamming signals transmitted by each jammer are received at the antenna elements from a respective direction. In such case, the output circuit of an anti-jamming circuit implementing multiple dual channel signal paths each producing a respective overall aggregated signal, may be adapted to aggregate, average, compensate, and/or the like the multitude of overall aggregated signals to produce the output signal driven to the RF receiver.

The multi-frequency anti-jamming circuit may present major benefits and advantages compared to existing anti-jamming and/or null-steering circuits, devices, systems and methods.

First, most if not all of the existing anti-jamming methods rely on processing the RF signals in a single frequency band, typically the frequency band applicable to the RF signals, i.e., the frequency band which carries the data encoded (modulated) in the RF signals. Such methods may be obviously highly limited and inefficient to receiver RF signals which are jammed by the jamming signals in the single frequency band. This is in contrast to the multi-frequency anti-jamming circuit which is adapted to apply null-steering in a plurality of frequency bands of which one or more may not be targeted by the jamming signals thus significantly increasing efficiency, reliability, and/or robustness of the multi-frequency anti-jamming circuit to recover RF signals subject to such jamming signals.

Moreover, as opposed to existing anti-jamming methods, which typically simply apply null-steering, the multi-frequency anti-jamming circuit applies two feedback loops. The first feedback loop comprises comparing the amplitudes and phases of the signals of each signal group and adjusting the signals to effectively null-steer them thus establishing optimal starting point for the second feedback loop in terms of the amplitude and phase of the adjusted signals. As such, the amplitude and phase of each aggregated signal aggregating the adjusted signals of a respective signal group starts from an optimal starting value and may be further analyzed to verify the amplitude complies with one or more criteria, conditions, and/or constraints. In case of incompliance, the amplitude and/or phase of one or more of the signals of a respective group may be further adjusted to bring the respective aggregated signal to compliance. This dual level feedback loop design may further increase efficiency, reliability, and/or robustness of the multi-frequency anti-jamming circuit to recover RF signals subject to such jamming signals.

Furthermore, the multi-frequency anti-jamming circuit may be highly scalable to include multiple directional antenna elements feeding additional signal paths which employ the same structure where each signal path may be adapted for processing RF signals received from a respective pair of directional antenna elements. The scaled multi-frequency anti-jamming circuit may be therefore capable to recover, with increased efficiency, reliability, and/or robustness, RF signals subject to directional jamming signals from a plurality of different directions. In particular, every signal path adapted and deployed to process RF signals received from an additional pair of antenna elements may enable recovery of the RF signals from the effects of jamming signals transmitted from another direction.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a schematic illustration of an exemplary anti-jamming circuit employing dual channel multi-frequency null-steering for recovering jammed RF signals, according to some embodiments of the present invention.

An exemplary anti-jamming circuit 100 may be designed, configured, and/or adapted to apply null-steering for recovering received RF signals which are possibly jammed by jamming signals in one or more frequency bands. In particular, the jamming signals, which may be intentionally emitted in malicious attempt to jam the RF signals and/or may be part of background emission, may be directional signals transmitted from a certain direction.

The anti-jamming circuit 100 may be used as a pre-processing circuit for recovering potentially jammed RF signals, for example, GNSS signals, communication signals, control signals and/or the like before driven into a respective RF receiver adapted to receive and decode such signals.

The anti-jamming circuit 100 may therefore employ one or more structures, architectures, and/or designs. For example, the anti-jamming circuit 100 may be constructed as an independent stand-alone device, Integrated Circuit (IC), component, and/or the like which may deployed between the RF receiver and antenna elements receiving the RF signals. In another example, the anti-jamming circuit 100 may be integrated in one or more RF receivers to remove the effects of possible jamming signals.

The anti-jamming circuit 100 may be adapted to receive and process RF signals received (intercepted, captured) via a plurality of antenna elements 102, for example, an antenna array, multiple independent antennas, and/or the like each having a different spatial positioning, for example, location, orientation, position, and/or the like.

As known in the art, each pair of antenna elements may enable recovery of the RF signals from directional jamming signals transmitted from a single direction. Therefore each additional pair of antenna elements 102 having different spatial positioning may allow recovery of the RF signals from directional jamming signal's transmitted from another (additional) direction with respect to the antenna elements 102.

This means that an anti-jamming circuit 100 adapted to process RF signals intercepted by a single pair of antenna elements 102 may recover RF signals from jamming signals transmitted from a single direction.

Therefore, an anti-jamming circuit 100 comprising two pairs of antenna elements 102, specifically two pairs of directional antenna elements 102 may be adapted to process RF signals intercepted by two pairs of directional antenna elements 102 may recover RF signals from jamming signals transmitted from two directions. Similarly, an anti-jamming circuit 100 comprising three pairs of directional antenna elements 102 may be adapted to process RF signals intercepted by three pairs of antenna elements 102 may recover RF signals from jamming signals transmitted from three directions, and so on(.

The anti-jamming circuit 100 may therefore comprise one or more signal paths, specifically dual channel signal paths, for example, signal path 1, signal path 2, signal path 3, and so on, each adapted to receive and process RF signals received (intercepted) from a respective pair of antenna elements 102, i.e., two channels of RF signals. Since each signal path is deployed to process RF signals received from a respective pair of antenna elements 102, as described herein before, each additional pair of antenna elements 102 feeding a respective additional signal path may enable the jamming circuit 100 to recover the RF signals from directional jamming signals transmitted from another direction.

It should be noted that in case of omnidirectional antenna elements 102, the anti-jamming circuit 100 may be capable and adapted accordingly to process and recover RF signals subject to jamming signals directional jamming signals transmitted from a single direction. However, in case it utilizes multiple pairs of directional antenna elements 102, the anti-jamming circuit 100 may be capable and adapted accordingly to process and recover RF signals subject to jamming signals directional jamming signals transmitted from a plurality of directions.

The anti-jamming circuit 100 may also include an output circuit 118 through which the processed RF signal, recovered from the jamming signals, may be driven to the RF receiver of the RF signals, for example, a GNSS receiver (sensor), a communications receiver, and/or the like.

Each signal path may comprise an input circuit 104, a signal adjustment circuit 106, a feedback circuit 108, a first-level aggregation circuit 112, a second feedback circuit 114, a second-level aggregation circuit 116.

Each of the plurality of signal paths may be constructed using the same circuits and components. However, one or more operational parameters of one or more of these circuits and/or components may be adjusted between signal paths and/or within one or more of the signal paths as described in details herein after, therefore, while describing a single signal path herein after, the same applies to each additional signal path of the anti-jamming circuit 100.

The input circuit 104 may be designed, configured and/or adapted to receive a respective pair of RF signals from a respective pair of antenna elements 102.

The input circuit 104 may further produce a plurality of signal groups each corresponding to a respective one of a plurality of frequency bands. In particular, each signal group may comprise a respective pair of filtered signals which map the respective pair of RF signals in a respective one of the frequency bands. For example, a first signal group may comprise a first signal received from a first antenna element 102 and a first signal received from a second antenna element 102 where the two first signals are filtered to produce respective filtered first signals in a first frequency band. A second signal group, however, may comprise a second signal received from a first antenna element 102 and a second signal received from a second antenna element 102 where the two second signals are filtered to produce respective filtered second signals in a second frequency band.

The signal adjustment circuit 106 may be designed, configured and/or adapted to adjust an amplitude and/or a phase of each of one or more of the filtered signals received from the input circuit 104. The signal adjustment circuit 106 may include one or more devices, circuits, elements, and/or the like employing one or more techniques, methods, and/or algorithms as known in the art for adjusting signals amplitude and/or a phase, for example, a vector modulator, a phase shifter, an amplifier, a Variable Gain Amplifier (VGA), and/or the like and/or a combination thereof.

The feedback circuit 108 may be designed, configured and/or adapted to control the signal adjustment circuit 106 to adjust the amplitude and/or the phase of one or more of the filtered signals of one or more of the signal groups according to a comparison between the filtered signals of the pair of the respective signal.

In particular, the feedback circuit 108 may be adapted to adjust the amplitude and/or shift the phase of one or more of the filtered signals until these values meet and/or comply with one or more predefined, and/or desired criteria, conditions, and/or constraints. For example, the feedback circuit 108 may adjust the amplitude and/or shift phase of one or more of the filtered signals until a difference between the amplitudes of the adjusted filtered signals of each signal group is minimized and the phases of the filtered signals of each signal group are substantially opposite, i.e., the difference is targeted to be 180°.

The feedback circuit 108 may comprise and/or use a control logic circuit 110 configured to receive the feedback result, for example, the output of the comparison between each pair of filtered signals of each signal group and control the signal adjustment circuit 106 to adjust the respective filtered signal(s) accordingly to minimize the difference between their amplitudes and shift their phase to be substantially opposite.

The control logic circuit 110 may employ one or more architectures, designs and/or implementations.

For example, the control logic circuit 110 may employ digital design, in which the feedback signals may be converted to digital representation, for example, via one or more Analog to Digital Converters (ADC). In such architectures, the control logic circuit 110 may comprise, for example, one or more controllers, micro-controllers, (MCU), microprocessors, and/or the like adapted to execute program instructions fetched from one or more program store memory devices, for example, a ROM, a RAM, a Flash device, and/or the like to execute the logic functionality of the control logic circuit 110. In another example, the control logic circuit 110 may comprise one or more programmable devices, for example, Field Programmable Gate Array (FPGA) and/or specific devices, for example, Application Specific Integrated Circuit (ASIC), and/or the like programmed via hardware (e.g., Verilog, VHDL, etc.), firmware and/or software to execute the logic functionality of the control logic circuit 110. In another example, the control logic circuit 110 may comprise one or more discrete devices, components, Integrated Circuits (IC), and/or circuits deployed, arranged and configured to facilitate the logic functionality of the control logic circuit 110. In another example, the control logic circuit 110 may employ analog design in which one or more discrete devices, components, ICs, and/or circuits which are analog devices may be deployed, arranged and configured to implement the logic functionality of the control logic circuit 110 without transforming to the digital domain.

Moreover, the control logic circuit 110 may be implemented through one or more combinations of such architectures, designs and/or implementations.

According to some embodiments, the control logic circuit 110 may be shared by a plurality and possibly all of the signal paths of the anti-jamming circuit 100. As such the control logic circuit 110 may control the signal adjustment circuits 106 of multiple signal paths according to feedback data received from their respective feedback circuits 108. However, each signal path may optionally comprise a dedicated control logic circuit 110 adapted to adjust only the filtered signals of the signal group going through the respective signal path.

Optionally, the control logic circuit 110 may be further adapted to sample one or more of the RF signals received at the input circuit 104 in order to identify, determine, and/or estimate whether the received RF signal are jammed.

The first-level aggregation circuit 112 may be designed, configured and/or adapted to aggregate together, for example, sum, combine, and/or the like the two adjusted signals of a respective signal group to produce a respective aggregated group signal.

The second-level feedback circuit 114 may be designed, configured and/or adapted to sample one or more of the aggregated signals in order to and control the signal adjustment circuit 106 to adjust the amplitude and/or shift the phase of one or more of the filtered signals of one or more of the signal groups until the sampled signal(s) comply and/or meet one or more criteria, conditions, constraints and/or the like. In particular, the goal of the feedback loop is to reduce, minimize and potentially remove the power level of the jamming signals in the sampled signals, for example, compared to the power level of the jamming signals at the input to the anti-jamming circuit 100.

For example, based on the sampled output of the second-level feedback circuit 114, the control logic 110 may adjust the amplitude and/or the shift phase of one or more of the filtered signals until the amplitude of a corresponding aggregated signal complies with one or more criteria, constraints, and/or conditions, falls below a certain power threshold, and/or the like. The target is reduction of jammer power level relative to the jammer power input value. This second feedback loop may be therefore finished when the aggregated signal drops below the threshold power level. Optionally, the control logic 110 may be adapted to stop iterating through the second-level feedback circuit 114 after reaching a certain number of iterations, for example, a predefined number of iterations without the aggregated signal converging to drop below the threshold power level.

The second-level aggregation circuit 116 may be designed, configured and/or adapted to aggregate together, for example, sum, combine, and/or the like the aggregated group signals corresponding to the two signal groups of the signal path to produce an overall aggregated signal, interchangeably designated sum signal.

The overall aggregated signal (produced by the second-level aggregation circuit 116) may be driven to the output circuit 118 which may be configured to further process the overall aggregated signals processed by multiple signal paths (if exist), for example, aggregate, average, compensate, and/or the like to produce the output signal driven to the RF receiver. The output circuit 118 may be further adapted to condition the output signal, for example, condition, smooth, filter, and/or the like.

As stated herein before, assuming the antenna elements 102 are directional, each of the signal paths may be a dual channel signal path adapted to process two signal groups (two channels) each comprising a pair of signals originating from two distinct directional antenna elements 102 having different spatial positioning. As stated herein before, each signal group may correspond to a respective frequency band (spectral range) and therefore each signal path may process two signal groups corresponding to two frequency bands.

Moreover, since, as described herein before, all signal paths are similar, only a single signal path is described herein after. This, however, should not be construed as limiting since the single signal path may be scaled, duplicated, and/or expanded to a plurality of signal paths each producing a respective output signal to the output circuit 118 which may process the output signals to produce an aggregated output signal which may, optionally, be further manipulated, for example, conditioned, filtered, and/or the like.

Reference is now made to FIG. 2, which is a schematic illustration of an exemplary single path anti-jamming circuit employing dual channel multi-frequency null-steering for recovering jammed RF signals, according to some embodiments of the present invention.

An exemplary anti-jamming circuit 200 such as the anti-jamming circuit 100 may comprise a single signal path such as the signal paths of an anti-jamming circuit 100 for receiving and processing RF signals from two antenna elements such as the antenna elements 102. The received RF signals may be potentially jammed and may thus comprise jamming signals and/or part thereof.

The two RF signals received by the signal processing circuit 200 may comprise a primary (P) RF signal received from a primary antenna element 202P such as the antenna element 102 and a secondary(S) RF signal received from a secondary antenna element 202S such as the antenna element 102.

An input circuit of the anti-jamming circuit 200 such as the input circuit 104 may comprise two or more splitters 204 adapted to split a received RF signal into two identical signals. For example, a splitter 204P may be deployed to split the primary RF signal into a primary first signal and a primary second signal. In another example, another splitter 204S may be deployed to split the secondary RF signal into a secondary first signal and a secondary second signal.

The primary first signal and the secondary first signal may be grouped together to form a first signal group while the primary second signal and the secondary second signal may be grouped together to form a second signal group.

The input circuit 104 may further comprise one or more sets of band-pass filters. Each set of band-pass filters may be deployed for filtering the signals of a respective signal group in a respective one of a plurality of frequency bands and each signal group may thus correspond to a respective frequency band.

The set of band-pass filters may comprise a first pair of band-pass filters 206P1 and 206S1 adapted to receive the signals of the first signal group, namely the primary first signal and the secondary first signal and filter them to produce a filtered primary first signal and a filtered secondary first signal respectively. The band-pass filters 206P1 and 206S1 may be selected, adjusted, and/or configured to pass signals in one of a plurality of frequency bands, for example, a first frequency band such that the filtered primary first signal may map the primary first signal in the first frequency band, and the filtered secondary first signal may map the secondary first signal in the first frequency band.

The set of band-pass filters may further comprise a second pair of band-pass filters 206P2 and 206S2 adapted to receive the signals of the second signal group, namely the primary second signal and the secondary second signal and filter them to produce a filtered primary second signal and a filtered secondary second signal respectively. The band-pass filters 206P2 and 206S2 may be selected, adjusted, and/or configured to pass signals in another one of a plurality of frequency bands, for example, a second frequency band, different from the first frequency band, such that the filtered primary second signal may map the primary second signal in the second frequency band, and the filtered secondary second signal may map the secondary second signal in the second frequency band.

Optionally, the frequency bands of the filtered signals of the first and second signal groups may be set, selected, and/or adjusted according to one or more parameters, attributes, and/or characteristics of the received RF signals, the RF receiver, and/or the application utilizing the RF signals. For example, assuming the RF signals are Global Positioning System (GPS) signals transmitted in two frequency bands, for example, 1575.42 MHz and 1227.60 MHz. In such case, the first frequency band may be selected around 1575.42 MHZ (e.g., ±10 MHz) and the band-pass filters 206P1 and 206S1 may be selected accordingly while the second frequency band may be selected around 1227.60 MHZ (e.g., ±10 MHz) and the band-pass filters 206P2 and 206S2 may be selected accordingly. In another example, assuming the RF signals are Long Term Evolution (LTE) cellular communication signals transmitted in two frequency bands, for example, 1900 MHZ and 2100 MHZ. In such case, the first frequency band may be selected around 1900 2 MHZ (e.g., ±15 MHZ) and the band-pass filters 206P1 and 206S1 may be selected accordingly while the second frequency band may be selected around 2100 MHZ (e.g., ±15 MHz) and the band-pass filters 206P2 and 206S2 may be selected accordingly.

Optionally, the filtered signals, for example, the filtered secondary first signal and/or the filtered secondary second signal may be monitored, for example, by a control logic circuit 220 such as the control logic circuit 110 to detect interference, i.e., to detect whether the received RF signal are subject to jamming signals which may degrade the RF signals.

For example, the control logic circuit 220 may monitor the power, and/or amplitude of the filtered signals and in case of excessive power indicative of jamming signals included in the RF signals, the control logic circuit 220 may determine that the RF signals are subject to jamming.

The input circuit may be adapted, configured and/or deployed with one or more provisions for monitoring and sampling the filtered signals. For example, the input circuit may comprise directional couplers extending out of the signal paths (traces) of the filtered signals, for example, the filtered secondary first signal and the filtered secondary second signal. The signals coming out of the directional couplers, designated intf, detect in the drawing, may be converted to digital representation, for example, using an ADC which may be monitored by a the control logic circuit 220, for example, an MCU, a power detector, and/or the like.

It should be noted, that the deployment shown in FIG. 2 is exemplary only and should not be construed as limiting since, as may become apparent to a person skilled in the art, other provisions and/or configurations may be applied for sampling the incoming signals. For example, directional couplers may extend out of the signal paths (traces) of the filtered primary first signal and the filtered primary second signal. In another example, one or more buffer devices may be placed to receive the filtered signals and drive them to the control logic circuit 220.

Based on analysis of the sampling the filtered signals, the control logic circuit 110 may determine and/or estimate whether the received RF signals are subject to jamming and may thus determine whether or not the RF receiver is targeted by a jamming attack.

Optionally, the control logic circuit 220 may further compute, estimate, and/or derive the level of the jamming interference, i.e., of the jamming signals based on the sampled filtered signals. For example, the control logic circuit 220 may estimate an expected, typical and/or nominal power of the RF signals when not subject to jamming and compare the estimated power to the actual power of the sampled RF signals. A difference between these values may be indicative of whether or not the RF signals are subject to jamming signals which may contribute to the overall power and/or amplitude of the received RF signals.

Moreover, the control logic circuit 220 may analyze sampled RF signals in multiple frequency bands, for example, the first frequency band (via the filtered secondary first signal) and the second frequency band (via the filtered secondary second signal). This may allow comparing the RF signals between multiple distinct frequency bands of which one or more may not be targeted by the jamming signals. Therefore by comparing between the power and/or amplitude of the RF signals as sampled in the multiple frequency band, the control logic circuit 220 may detect that the received RF signals are subject to jamming and may thus comprise power contributed by the jamming signals.

The filtered signals coming out of the filters 206 may be driven to a signal adjustment circuit such as the signal adjustment circuit 106 which may comprise a set of vector modulators 210 adapted to adjust an amplitude and/or a phase of each filtered signal. In particular, the filtered signals of each signal group may be routed to a common vector modulator. For example, the filtered primary first signal and the filtered secondary first signal may be routed to a first vector modulator 210(1) adapted to adjust the amplitude and/or the phase of the filtered primary first signal and/or of the filtered secondary first signal. In another example, filtered primary second signal and the filtered secondary second signal may be routed to a second vector modulator 210(2) adapted to adjust the amplitude and/or the phase of the filtered primary second signal and/or of the filtered secondary second signal.

Specifically, the vector modulators 210 may be controlled to adjust the amplitude and/or the phase of one signal compared to another signals. For example, the first vector modulator 210(1) may be operated to adjust the amplitude and/or the phase of the filtered primary first signal compared to the amplitude and/or the phase of the filtered secondary first signal and/or vice versa. In another example, the second vector modulator 210(2) may be operated to adjust the amplitude and/or the phase of the filtered primary second signal compared to the amplitude and/or the phase of the filtered secondary second signal and/or vice versa.

The vector modulators 210 may adjust the filtered signals according to instructions received from one or more controllers, for example, the control logic circuit 220 which may be communicatively coupled to the vector modulators 210 via one or more control interfaces, for example, traces, wires, a control and/or communication channel, a bus, and/or the like.

As stated herein before, the exemplary anti-jamming circuit 200 implements the signal adjustment circuit 106 using vector modulators 210. However, as stated herein before, the anti-jamming circuit 200 may utilize one or more other devices, circuits, and/or technologies to implement its signal adjustment circuit 106, for example, a pair of phase shifter and VGA sets each comprising a phase shifter for adjusting a phase of a filtered signal and a VGA for adjusting an amplitude of the filtered signal.

Optionally, the filtered signals may be routed from the filters 206 to the vector modulators 210 via one or more VGAs 212 adapted to adjust, manipulate, balance, and/or condition one or more of the filtered signals. For example, the filtered primary first signal may go through a VGA 208P1, the filtered primary second signal may go through a VGA 208P2, the filtered secondary first signal may go through a VGA 208S1, and the filtered secondary second signal may go through a VGA 208S1.

The VGAs 208 may be adapted to adjust the filtered signals as known in the art, for example, adjust (e.g., attenuate, amplify, etc.) the filtered RF signals which may have a wide dynamic range in order to be effectively processed by the vector modulators 210. In another example, the VGAs 208 may adjust the filtered signals to amplify them in order to compensate for signal loss.

The adjusted signals coming out of the vector modulators 210 may be driven to respective aggregation circuits such as the first-level aggregation 112 which may each comprise, for example, a signal combiner 216, specifically first-level signal combiner 216 adapted to aggregate, for example, sum, combine, and/or the like the adjusted signals of each signal group.

For example, the signals of the first group, namely the adjusted primary first signal and the adjusted secondary first signal coming out of the first vector modulator 210(1) may be routed to a first-level first signal combiner 216(1) adapted to aggregate the adjusted primary first signal and the adjusted secondary first signal to produce an aggregated first signal. In another example, the signals of the second group, namely the adjusted primary second signal and the adjusted secondary second signal coming out of the second vector modulator 210(2) may be routed to a first-level second signal combiner 216(2) adapted to aggregate the adjusted primary second signal and the adjusted secondary second signal to produce an aggregated second signal.

In parallel to routing them to the signal combiners 216, the adjusted signals of the signal groups, i.e., the first and second signal groups are routed to a set of comparators 214 constituting a first feedback loop of a feedback circuit such as the feedback circuit 108. For example, in parallel to their routing to the first signal combiner 216(1), the signals of the first group, i.e., the adjusted primary first signal and the adjusted secondary first signal may be also routed to a first comparator 214(1) adapted to compare the amplitude and phase of the adjusted first signals. In another example, in parallel to their routing to the second signal combiner 216(2), the signals of the second group, i.e., the adjusted primary second signal and the adjusted secondary second signal may be also routed to a second comparator 214(2) adapted to compare the amplitude and phase of the adjusted second signals.

Optionally, the adjusted signals may be routed from the vector modulators 210 to the comparators 214 via one or more VGAs 212 adapted to adjust, manipulate, balance, and/or condition one or more of the adjusted signals. For example, the adjusted primary first signal may be routed to the first comparator 214(1) via a VGA 212(1)1 and the adjusted secondary first signal may be routed to the first comparator 214(1) via a VGA 212(1)2. In another example, the adjusted primary second signal may be routed to the second comparator 214(2) via a VGA 212(2)1 and the adjusted secondary second signal may be routed to the second comparator 214(2) via a VGA 212(2)2.

The output of the comparators 214 may be routed to the control logic circuit 220 thus establishing a first feedback loop in which the control logic circuit 220 may control and operate the vector modulators 210 for adjusting one or more signals of one or more of the signal groups.

In particular, the control logic circuit 220 may operate the vector modulators 210 to adjust the amplitude and/or phase of the signals of each signal group in attempt minimize a difference between the amplitude of the signals of the group and reach a phase difference of 180° between the phases of the signals of each signal group, i.e., until their phases are opposite each other.

For example, based on the output of the first comparator 214(1), designated Feed-Back (FB) 1, the control logic circuit 220 may operate the first vector modulator 210(1) to adjust the amplitude and/or phase of the primary first signal and/or the secondary first signal. Specifically, the control logic circuit 220 may operate the first vector modulators 210(1) to adjust the amplitude and/or phase of the primary first signal and/or the secondary first signal until a difference between the amplitude of the adjusted primary first signal and the amplitude of the adjusted secondary first signal is minimized and their phases are substantially opposite, i.e., the difference between the phase of the adjusted primary first signal and the phase of the adjusted secondary first signal is optimized towards 180°.

In another example, based on the output of the second comparator 214(2), designated FB 2, the control logic circuit 220 may operate the second vector modulator 210(2) to adjust the amplitude and/or phase of the primary second signal and/or the secondary second signal. Specifically, the control logic circuit 220 may operate the second vector modulator 210(2) to adjust the amplitude and/or phase of the primary second signal and/or the secondary second signal until a difference between the amplitude of the adjusted primary second signal and the amplitude of the adjusted secondary second signal is minimized and their phases are substantially opposite, i.e., the difference between the phase of the adjusted primary second signal and the phase of the adjusted secondary second signal is optimized towards 180°.

After aggregated, the aggregated signals by the first-level signal combiners 216 may be routed to a second-level signal combiner 222 adapted to aggregate, for example, sum, combine, and/or the like the two aggregated signals each aggregating the adjusted signals of a respective one of the signal groups to produce and output an overall aggregated signal which, optionally, may be output, driven, and/or routed to the RF receiver optionally via an output circuit such as output circuit 118. For example, a first aggregated signal aggregating the adjusted signals of the first signal group, i.e., the adjusted primary first signal and the adjusted secondary first signal, and a second aggregated signal aggregating the adjusted signals of the second signal group, i.e., the adjusted primary second signal and the adjusted secondary second signal, may be routed to the signal combiner 222.

Optionally, the aggregated signals may be routed from the first-level first signal combiners 216 to the second-level signal combiner 222 via one or more VGAs 218 adapted to adjust, manipulate, balance, and/or condition one or more of the aggregated signals. For example, the first aggregated signal may go through a first VGA 218(1) and the second aggregated signal may go through a second VGA 218(2). As described herein before, the VGAs 218 may be adapted to adjust the aggregated signals as known in the art, for example, adjust, attenuate, amplify, and/or the like the aggregated signals.

Moreover, the aggregated signals, i.e., the first aggregated signal and the second aggregated signal may be sampled to establish another feedback loop, a second feedback loop, designated FB 3, of the feedback circuit 108. For example, the first aggregated signal and the second aggregated signal may be routed via one or more provisions, for example, a directional coupler for sampling by the control logic circuit 220.

Based on sampled values of the first aggregated signal and/or second aggregated signal, for example, power, amplitude, and/or the like, the control logic circuit 220 may control one or more of vector modulator 210 to adjust the amplitude and/or the phase of one or more of the signals of one or more of the signal groups, for example, the primary first signal and/or the secondary first signal of the first signal group, and/or the primary second signal and/or the secondary second signal of the second signal group.

In particular, the control logic circuit 220 may operate the vector modulator(s) 210 to adjust the amplitude and/or the phase of one or more of the filtered signals of one or more of the signal groups to meet and/or comply with one or more criteria and/or conditions. For example, the control logic circuit 220 may operate the vector modulator(s) 210 to adjust the amplitude and/or the phase of one or more of the filtered signals such that the corresponding aggregated signals falls below a certain power threshold, exceeds a certain power threshold, and/or the like.

For example, the control logic circuit 220 may control the first vector modulator 210(1) to adjust the amplitude and/or the phase of the filtered primary first signal and/or filtered secondary first signal to eventually produce a first aggregated signal having power and/or amplitude that falls below a certain power threshold. In another example, the control logic circuit 220 may control the second vector modulator 210(2) to adjust the amplitude and/or the phase of the filtered primary second signal and/or filtered secondary second signal to eventually produce a second aggregated signal having power and/or amplitude that falls below a certain power threshold.

Reference is now made to FIG. 3, which is a flowchart of an exemplary process of recovering jammed RF signals using and anti-jamming circuit employing dual channel multi-frequency null-steering, according to some embodiments of the present invention.

An exemplary process 300 may be executed by an anti-jamming circuit such as the anti-jamming circuit 100 for recovering RF signals which may be subject to jamming.

As shown at 302, the process 300 starts with the anti-jamming circuit 100 receiving RF signals from a plurality of antenna elements such as the antenna elements 102.

The RF signals received, for example, via an input circuit such as the input circuit 104, may be potentially subject to jamming which may degrade the RF signals and potentially prevent efficient recovery of data encoded in the RF signals.

As shown at 304, each received RF signal may be split to two identical signals, for example, using splitters such as the splitters 204 deployed in the exemplary input circuit 104. As such, each RF signal may be split to a first signal and a second signal.

As shown at 306, a plurality of signal groups may be produced, for example, by the input circuit 104 where each signal group comprises a respective pair of split signals received from two antenna elements 102 of the plurality of antenna elements 102.

In particular, every two signal groups may be produced for every signal path circuit supported by the anti-jamming circuit 100.

For example, a first signal group comprising the first signals of two different RF signals received from distinct antenna elements 102, and a second signal group comprising the second signals of the two different RF signals may be propagated via a first signal path of the anti-jamming circuit 100.

As shown at 308, the signals of each signal group may be passed through a respective set (pair) of band-pass filters such as the band-pass filters 206 of exemplary input circuit 104, adapted to map the respective pair of signals in a respective one of a plurality of frequency bands, i.e., pass only signal components of the respective pair of signals which are within the respective frequency band.

As such, each signal group may correspond to the respective frequency band as it comprises a pair of filtered signals originating from two distinct antenna elements 102 and mapped to a respective one of the plurality of frequency bands.

For example, the first signal group may comprise the two first signals mapped to a first frequency band and the second signal group may comprise the two second signals mapped to a second frequency band.

Optionally, the frequency bands of the filtered signals, i.e., the frequency band that the band-pass filters are adapted to pass may be set, selected, and/or adjusted according to one or more parameters, attributes, and/or characteristics of the received RF signals, the RF receiver, and/or the application utilizing the RF signals.

As shown at 310, the amplitude and/or phase of one or more of the filtered signals of one or more of the signal groups, may be adjusted for example, using vector modulators such as the vector modulators 210 deployed in an exemplary signal adjustment circuit such as the signal adjustment circuit 106.

As such, each signal group may now comprise a pair of adjusted signals produced by the signal adjustment circuit 106 deployed to adjust the filtered signals of the respective signal group.

As shown at 312, which is a conditional step, the amplitude and phase of the adjusted signals of each of the signal groups may be compared, for example, using comparators such as the comparators 214 of an exemplary feedback circuit 108 and a control logic circuit such as the control logic circuit 110 adapted to analyze the output of the comparators 214.

For example, adjusted first signals of the first group may compared with each other to produce FB1 and adjusted second signals of the second group may compared with each other to produce FB2.

FB1 and FB2 may be analyzed by a control logic circuit such as the control logic circuit 220 to compute, estimate, derive, and/or otherwise determine a difference between the amplitudes and phases of the two signals of each signal group.

In case the difference between the amplitudes of the two signals of the respective signal group is minimized and their phases is substantially opposite, i.e., have a phase difference of 180°, the process 300 may branch to 314. However, in case the amplitudes' difference is not minimized and/or the phases are not substantially opposite, the process 300 may branch back to 310 where the filtered signals of the respective signal group may be further adjusted until the difference between their amplitudes is minimized and their phases are substantially opposite.

As shown at 314, the two adjusted signals of each signal group may be aggregated, for example, summed, added, combined, and/or the like to produce respective aggregated signals, for example, using signal combiners such as the signal combiners 216 of an exemplary aggregation circuit such as the aggregation circuit 112.

For example, the adjusted first signals of the first group may be aggregated to produce an aggregated first signal and the adjusted second signals of the second group may be aggregated to produce an aggregated second signal.

As shown at 316, which is a conditional step, the amplitude of the aggregated signals of each of the signal groups may be sampled and analyzed by a control logic circuit such as the control logic circuit 110 to compute, estimate, derive, and/or otherwise determine whether the sampled amplitude complies with one or more criteria, constraints, and/or conditions, for example, falls below a certain power threshold, and/or the like it's should be below any threshold.

For example, as seen in FIG. 2, the amplitude of the aggregated first signal and/or the aggregated second signal may be sampled and analyzed by a control logic circuit such as the control logic circuit 220 to determine whether they comply with the criteria, constraint(s), and/or condition(s).

In case the amplitudes of the aggregated signals complies with the criteria, constraint(s), and/or condition(s), the process 300 may branch to 318. However, in case the amplitude of a respective aggregated signal does not comply with the criteria, constraint(s), and/or condition(s), the process 300 may branch back to 310 where the filtered signals of the corresponding signal group from which the respective aggregated signal was produced may be further adjusted until the amplitude of the respective aggregated signal complies with the criteria, constraint(s), and/or condition(s).

As shown at 318, the aggregated signals of every one or more pairs of signal groups may be aggregated together, for example, summed, added, combined, and/or the like to produce an overall aggregated signal.

The aggregated signals of the signal groups may be aggregated, for example, using a signal combiner such as the signal combiner 222 of an exemplary aggregation circuit such as the aggregation circuit 116.

For example, the aggregated first signal and the aggregated second signal may be aggregated to produce an overall aggregated signal.

As shown at 320, in case the anti-jamming circuit 100 comprises a plurality of signal paths fed from a plurality of pairs of directional antenna elements 102, the overall aggregated signals produced by multiple signal path circuits of the anti-jamming circuit 100 may be combined, for example, by an output circuit such as the output circuit 118 which may be adapted to further process the received overall aggregated signals, for example, aggregate, average, compensate, and/or the like to produce an output signal driven to the RF receiver.

Optionally, the output circuit 118 may be further adapted to condition the output signal, for example, condition, smooth, filter, and/or the like.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms RF signals and RF receiver, are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. An anti-jamming circuit for null-steering jamming radio-frequency (RF) signals, comprising:
    at least one input circuit adapted to:
        receive a plurality of RF signals from a plurality of antenna elements, and
        produce a plurality of signal groups each corresponding to a respective one of a plurality of frequency bands, each signal group comprises a respective pair of filtered signals received from a respective pair of the plurality of antenna elements each mapping a respective one of the plurality of RF signals in the respective frequency band;
    a feedback circuit adapted to:
        adjust the amplitude and/or the phase of at least one filtered signal of each signal group according to comparison between the pair of filtered signals of the respective group until a difference between the amplitudes of the adjusted signals of each signal group is minimized and their phases are opposite,
        aggregate the pair of adjusted signals of each signal group to produce a plurality of aggregated group signals, and
        aggregate the plurality of aggregated group signals to produce an overall aggregated signal; and
    an output circuit adapted to output the aggregated signal to at least one receiver adapted to extract data from the aggregated signal.

2. The anti-jamming circuit of claim 1, wherein the at least one input circuit comprises:
    a splitter adapted to split a primary RF signal received from a primary antenna element of the two antenna elements into a primary first signal and a primary second signal, and
    at least another one splitter adapted to split a secondary RF signal received from a secondary antenna element into a secondary first signal and a secondary second signal,
    wherein the primary first signal and the secondary first signal are grouped together to form a first group of the plurality of signal groups, and the primary second signal and the secondary second signal are grouped together to form at least one second group of the plurality of signal groups.

3. The anti-jamming circuit of claim 2, wherein the at least one input circuit comprises at least one set of band-pass filters, the at least one set of band-pass filters comprises:
    a first pair of band-pass filters adapted to produce a filtered primary first signal mapping the primary first signal in a respective one of the plurality frequency bands, and a filtered secondary first signal mapping the secondary first signal in a respective one of the plurality frequency bands, and
    a second pair of band-pass filters adapted to produce a filtered primary second signal mapping the primary second signal in another one of the plurality frequency bands, and a filtered secondary second signal mapping the secondary second signal in the another one of the plurality frequency bands.

4. The circuit of claim 3, further comprising adjusting the first band-pass filters and/or the second band-pass filters to select the respective frequency band and/or the another one frequency band.

5. The circuit of claim 3, further comprising monitoring at least one of the filtered signals to detect jamming signals.

6. The anti-jamming circuit of claim 3, wherein the feedback circuit comprises at least one set of vector modulators, the at least one set of vector modulators comprises:
a first vector modulator adapted to adjust an amplitude and/or a phase of each filtered first signal, and
a second vector modulator adapted to adjust an amplitude and/or a phase of each filtered second signal.

7. The anti-jamming circuit of claim 6, wherein the at least one input circuit comprises at least one set of variable gain amplifiers (VGA) adapted to adjust at least one of the filtered first signals and/or at least one of the filtered second signals to balance them before injected to the first vector modulator and/or the second vector modulator respectively.

8. The anti-jamming circuit of claim 6, wherein the feedback circuit comprises at least one set of comparators, the at least one set of comparators comprises:
a first comparator adapted to compare the amplitude and phase of the adjusted first signals, and
a second comparator adapted to compare the amplitude and phase of the adjusted second signals.

9. The anti-jamming circuit of claim 8, wherein the feedback circuit comprises at least one set of first-level signal combiners, the at least one set of signal combiners comprises:
a first signal combiner adapted to aggregate the adjusted first signals, and
a second signal combiner adapted to aggregate the adjusted second signals.

10. The anti-jamming circuit of claim 9, wherein the feedback circuit comprises at least one second-level signal combiner adapted to aggregate the aggregated first signals and the aggregated second signals.

11. The anti-jamming circuit of claim 9, further comprising a logic circuit configured to:
sample the output of the first signal combiner and the output of the second signal combiner, and
control the first vector modulator to adjust the amplitude and/or the phase of at least one of the filtered first signals according to the sampled output, and/or control the second vector modulator to adjust the amplitude and/or the phase of at least one of the filtered second signals according to the sampled output.

12. The anti-jamming circuit of claim 8, wherein each antenna element of each pair of antenna elements has a different spatial positioning.

13. A method of null-steering jamming radio-frequency (RF) signals, comprising:
receiving a plurality of RF signals from a plurality of antenna elements,
producing a plurality of signal groups each corresponding to a respective one of a plurality of frequency bands, each signal group comprises a respective pair of filtered signals received from a respective pair of the plurality of antenna elements each mapping a respective one of the plurality of RF signals in the respective frequency band,
adjusting the amplitude and/or the phase of at least one filtered signal of each signal group according to comparison between the pair of filtered signals of the respective group until a difference between the amplitudes of the adjusted signals of each signal group is minimized and their phases are opposite,
aggregating the pair of adjusted signals of each signal group to produce a plurality of aggregated group signals;
aggregating the plurality of aggregated group signals to produce an aggregated signal; and
outputting the aggregated signal to at least one receiver adapted to extract data from the aggregated signal.

14. The method of claim 13, wherein the plurality of signal groups are formed by:
splitting a primary RF signal received from a primary antenna element of the two antenna elements into a primary first signal and a primary second signal,
splitting a secondary RF signal received from a secondary antenna element into a secondary first signal and a secondary second signal,
grouping the primary first signal and the secondary first signal to form a first group of the plurality of signal groups, and
grouping the primary second signal and the secondary second signal to form at least one second group of the plurality of signal groups.

15. The method of claim 14, wherein:
a filtered primary first signal is produced to map the primary first signal in a respective one of the plurality frequency bands, and a filtered secondary first signal is produced to map the secondary first signal in a respective one of the plurality frequency bands, and
a filtered primary second signal is produced to map the primary second signal in another one of the plurality frequency bands, and a filtered secondary second signal is produced to map the secondary second signal in the another one of the plurality frequency bands.

16. The method of claim 15, wherein a respective adjusted first signal is produced by adjusting an amplitude and/or a phase of each filtered first signal, and a respective adjusted second signal is produced by adjusting an amplitude and/or a phase of each filtered second signal.

17. The method of claim 16, wherein the comparison of the pair of filtered signals of a first signals group comprises comparing the amplitude and phase of the adjusted first signals, and comparison of the pair of filtered signals of a second signals group comprises comparing the amplitude and phase of the adjusted second signals.

18. The method of claim 17, wherein the adjusted first signals are aggregated to produce an aggregated first signal and the adjusted second signals are aggregated to produce an aggregated second signal.

19. The method of claim 18, further comprising:
sampling the aggregated first signal and the aggregated second signal, and
adjusting the amplitude and/or the phase of at least one of the filtered first signals according to the sampled output, and/or
adjusting the amplitude and/or the phase of at least one of the filtered second signals according to the sampled output.

20. The method of claim 18, wherein the aggregated first signal and the aggregated second signal are aggregated to generate an overall aggregated signal.

* * * * *